July 31, 1951 W. P. NIBLICK 2,562,569
MOTION TRANSLATING APPARATUS
Filed Nov. 29, 1947 2 Sheets-Sheet 1
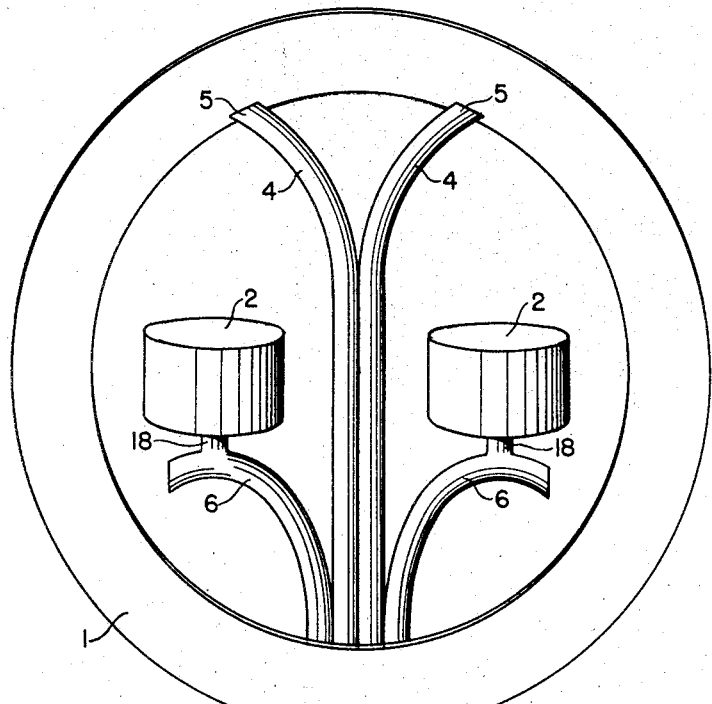
Fig.1
Fig.2
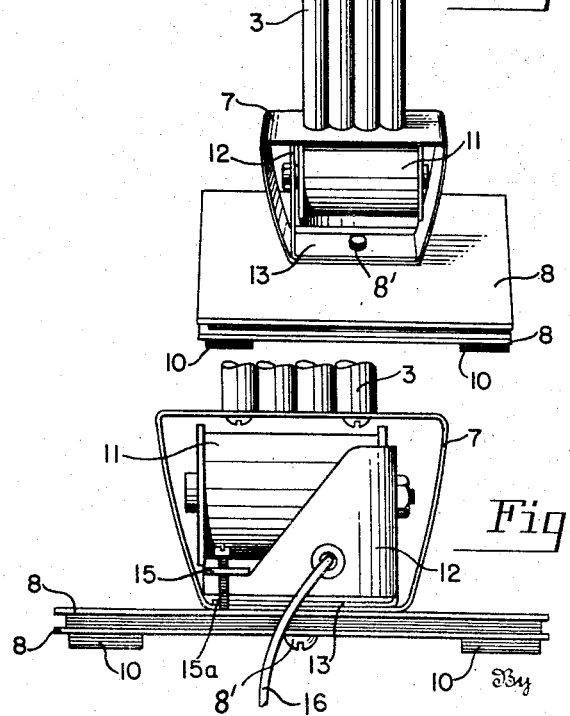
Fig.3
Inventor
WALTER P. NIBLICK
By J. C. Walker
Attorney July 31, 1951  W. P. NIBLICK  2,562,569
MOTION TRANSLATING APPARATUS
Filed Nov. 29, 1947  2 Sheets-Sheet 2

Inventor
WALTER P. NIBLICK
By F. L. Walker
Attorney

Patented July 31, 1951

2,562,569

UNITED STATES PATENT OFFICE 2,562,569

MOTION TRANSLATING APPARATUS

Walter P. Niblick, Dayton, Ohio

Application November 29, 1947, Serial No. 788,871

9 Claims. (Cl. 172—126)

This invention pertains to a motion translating apparatus, and more particularly to a mechanism and method of operation for automatically changing reciprocatory vibration into continuing rotary motion.

While the instant assembly is capable of a wide range of application for practical purposes, as for example, the actuation of animated toys and animated signs, and for energization of mechanical devices and scientific apparatus, for illustrative purposes, but with no intent to unduly limit the scope or application of the invention, it is herein illustrated and described as embodied in an advertising, or window display device, but is obviously not limited thereto.

The object of the invention is to provide a vibratory motion transmitting apparatus as well as the means and mode of operation thereof which may not only be economically manufactured, but will be efficient in use, automatic in operation, uniform in action, of relatively few operating parts, and unlikely to get out of repair.

A further, and important object of the invention is to provide a motion transmitting apparatus, wherein the mode of operation and transmission will not be readily apparent and wherein there will appear an air of mystery, sufficient to arouse curiosity of observers and attract attention to the device and its operation.

A further object of the invention is to provide a simple compact assembly for simultaneously transmitting rotary motion about angularly disposed axes to different bodies without the use of wires, belts, rods or other conventional interconnecting power transmission elements.

A further object of the invention is to provide a motion transmitting apparatus possessing the advantageous structural features, the inherent meritorious characteristics, and the mode of operation herein set forth, or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings or their equivalents.

In the drawings wherein is illustrated a preferred, but obviously not necessarily the only form of embodiment of the invention, Fig. 1 is a perspective front elevation of an assembled window display, or advertising device embodying the present invention.

Fig. 2 is a side elevation of the assembled device shown in Fig. 1.

Fig. 3 is a side elevation of the vibratory actuating unit, viewed from the side opposite that shown in Fig. 1.

Like parts are indicated by similar characters of reference throughout the several views.

Figure 4:
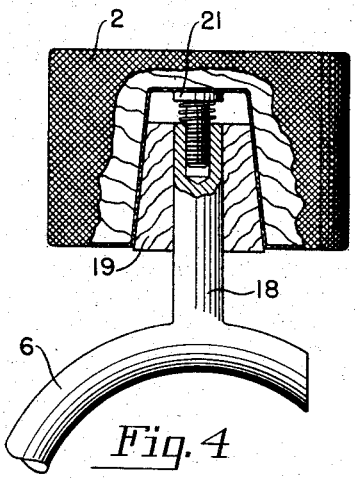
Fig. 4 is a sectional side elevation of one of the rotary driven members and its support partly broken away.
Figure 5:
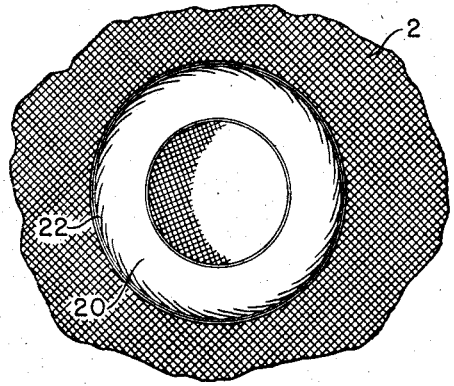
Fig. 5 is a bottom plan view of one of the rotary driven members, removed from its support.
Figure 6:
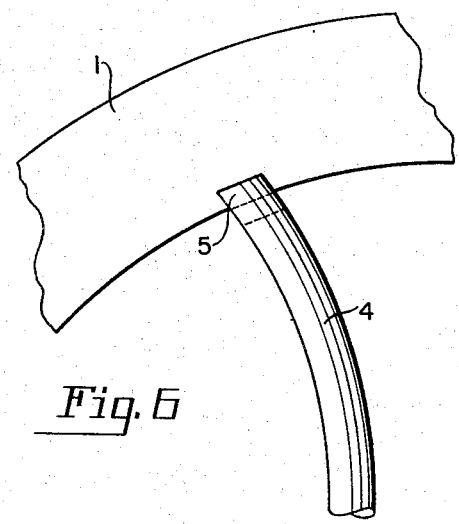
Figs. 6 and 7 are respectively detail front and side elevations, of an annular rotary member and its support.
Figure 7:
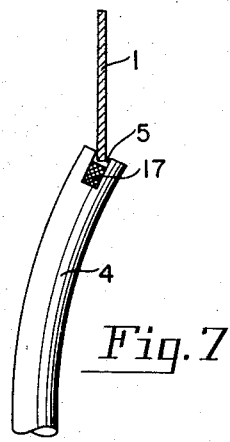

Referring to the drawings, particularly Figs. 1 and 2 thereof, there is illustrated an assembly, wherein an annular member 1 rotates in a vertical plane, about an undefined horizontal axis, while two relatively spaced, either cylindrical or oval members 2—2 simultaneously rotate in a horizontal plane about vertical axes. The rotary members 1 and 2 are supported on a branched standard 3, preferably, but not necessarily, of translucent plastic material, such as that known as "Lucite." Such material is desirable, but not essential. It is sufficiently transparent that it may readily be observed that no wires, fluid pressure ducts, or analogous motion transmitting means extend therethrough for transmitting motion to the members 1 and 2. The standard 3 is formed with a pair of arcuate branches 4—4 which are notched at 5 at their ends, in which the ring or annular member 1 is suspended. The branches 4 are not only laterally curved, as shown in Fig. 1, but are also slightly bent forwardly as shown in Fig. 2, whereby the annular rotor 1 while suspended from the terminal notches 5 of the arms 4, will hang free in non-contacting relation with the lower portion of the standard for independent relative rotation. The rotary members 2—2 are carried by laterally curved branches 6 which project from the standard 3 at a lower level.

The supporting standard 3 surmounts a vibratory frame 7 of magnetic metal, which is fixedly secured to a vibration absorbent base. The base comprises relatively spaced rigid plates 8 between which is interposed a resilient stratum, which may be sponge rubber or the like. The spaced superposed plates 8 are interconnected by a tie bolt 8', adjustment of which controls or regulates the natural resiliency of the base structure. The vibration frequency of the base structure is thereby controlled and may be adjusted so as to vibrate in synchronism with the frequency of the superstructure. The base plates 8 are supported on resilient feet 10 also of sponge rubber. Inside the vibratory frame 7 is an alternating current electromagnet 11 fixedly attached to an upstanding arm 12 of a bracket 13 attached to the bottom of the frame 7, of which magnet 11 the frame 7 comprises an armature subjected to the intermittent attraction thereof. The upright supporting arm of the magnet bracket 13 is formed with an integral arm or wing 15 provided at its extremity with an adjusting screw engaging the supporting base plate 8. By adjustment of the screw 15a, the arm 12 may be slightly flexed to shift the pole of the magnet 11 toward or from the side of the armature frame 7. The coil of the electromagnet 11 is connected by the electrical cable 16 with any convenient source of alternating current by which the magnet 11 is caused to rapidly attract and release the armature frame 7, thereby vibrating the supporting standard 3 and branch arms 4 and 6 thereof. The force and violence of vibration is regulated by variation of the relation of the magnet 11 to the armature frame 7, incident to adjustment of the screw 15a and tilting movement of the supporting arm 12, by which the magnet 11 is advanced or retracted. Thus, vibratory influence is transmitted through the standard 3 and branch arms 4 and 6 to the rotary elements 1 and 2.

The rotor ring 1 may be of any relatively stiff, light weight material, such as thin gage metal or cardboard, either with or without an ornamental surface cover of paper or of sheet fabric. The rotary ring 1 may be lettered or imprinted to identify particular goods being advertised, or the name of an advertiser, or may be otherwise illustrated for display purposes.

The ring 1 is loosely suspended in the terminal notches 5 of the curved branch arms 4. To prevent undue wear of the notches 5 or the inner margin of the ring, bearing inserts 17 may be inserted within the notches 5, upon which the ring 1 may ride. Such bearing inserts 17 may be bits of metal, or of composition, or they may comprise small wads of felt. Usually the vibratory motion of the respective branch arms 6 occur in unison and in the same direction. The vibratory motion of the arms 4 in one direction may differ slightly in speed or violence relative to that in the opposite direction, whereby the inertia of the ring 1 is overcome, causing the ring 1 to move in one direction under vibratory influence more readily or to greater extent than it responds to reverse vibrations. The vibration being rapid and the responsive motion of the ring being cumulative, the ring acquires, what appears to be a substantially continuous rotary traveling motion. The travel motion of the ring may be accelerated or modified, by providing one of the supporting notched arms 4 with a more or less tenacious insert 17, such as rubber, or a pile or nap fabric, having its nap extending in one direction only, while the other notched arm may be provided with a smooth or sleek, nontenacious insert 17 which will in no way retard or influence the motion of the ring 1. By this means the ring 1 may be given a continuous rotary motion solely by the reciprocatory vibratory motion transmitted by the electro magnet 11. Likewise the speed of rotation of the ring 1 may be varied, either by changing the material of the bearing inserts 17, whereby they will possess more or less tenacity in their engagement in one direction with the ring, or by adjustment of the screw 15a by which the attractive influence of the electro magnet 11 upon the armature frame 7 may be increased or diminished.

The rotary members 2—2 are mounted on spindles 18 vertically projecting from the lowermost branch arms 6 having thereon stationary truncated conical heads 19. The rotary members 2 have therein corresponding truncated conical recesses 20 which fit over the truncated conical heads 19 of the spindles 18. The rotary members 2 are supported upon flat headed adjustable terminal screw studs 21. The interior walls of the cavities 20 of the rotary members 2 are lined with a nap or pile bearing fabric 22 having its grain, or the nap or pile thereof extending peripherally. The construction and arrangement is such that the rotary member 2 may turn freely in a direction agreeing with that of the nap or pile, but will resist relative movement thereover in reverse direction.

If so desired, the nap or pile bearing fabric cover may be applied to the exterior of the truncated conical heads 19 of the spindles in lieu of the interior surfaces of the cavities 20. Thus, upon vibratory motion of the standard 3 and spindles 18 the tenacity of the nap or pile of the cover fabric will frictionally engage the vibratory head 19, causing unidirectional rotation of the member 2. Alternate vibratory impulses of the head 19 engages the nap on opposite sides of the member 2, imparting to the member a series of intermittent unidirectional rotary impulses. Due to the rapidity of the vibratory impulses, which are not discernible to an ordinary observer, the rotation of the member 2 appears to be uniformly continuous. The rotary member 2 responds to the vibratory impulses in both directions and moves in unison therewith, such impulses being applied alternately to opposite sides of the member to produce unidirectional rotation thereof.

Articles for sale, or being advertised, may be positioned upon the rotary members 2 for unison rotation. Such articles as necklaces, bracelets, or watch bands for wrist watches may be mounted in encircling relation upon the members 2 for progressive rotation. The speed of rotation of the member 2 may be regulated in the same manner as before described relative to the rotary ring 1, by varying the adjustment of the screw 15a to cause the magnet 11 to approach or recede from the vibratory armature frame 7. By thus varying the relation of the electromagnet toward and from the vibratory spring unit 7, which serves as an armature influenced by the electromagnet 11, the character and amplitude of vibratory impulses transmitted through the standard 3 to the supports for the members 1 and 2 may be varied and regulated.

The speed of rotation of the revoluble members 2 may also be varied by vertical adjustment of the supporting screw stud 21. Such adjustment alters the spacing of the nap or pile covering material relative to the spindle 18, thereby regulating the speed of rotation. By such means the speed of the two rotary members 2 may be relatively adjusted with little difficulty.

The rotary ring 1 may be arranged to progressively transport a series of figures, or may carry a succession of letters of a name, or a sales slogan or other advertising data. The present illustrative embodiment of the invention is but one of several applications thereof by which the present invention and its mode of operation may be usefully utilized.

In installing the present apparatus as a window display or the like, the vibrating electromagnet 11 and its armature frame 7 and the supporting base 8 are ordinarily concealed from view by the window dressing equipment or by disposition of adjacent articles.

It is found in practice that a body of friction material, such as some compositions of rubber, may be advantageously inserted in the notch 5 of one arm of the bifurcated support 4—4, to afford traction to the ring 1, while the opposite arm of the support is provided with an insert of non-friction cushion material such as, for example, sponge rubber which absorbs the vibration, and a cover over the sponge rubber of relatively smooth, non-tenacious tape, upon which the ring 1 may freely slide, and which offers little or no resistance to travel of the ring. By transposing the friction insert and the smooth vibration absorbent insert in the notches 5 of the respective arms, the direction of rotation of the ring 1 may be reversed.

Likewise the members 2 may be revolubly actuated in reverse direction by applying the nap bearing surface cover to the surface of the spindle 18 rather than to the interior of the recess 20. The direction of rotation of the members 2 may also be reversed by reversing the direction of the nap or pile covering, whether it be applied to the spindle 18 or to the interior of the recess 20.

An advantageous feature of the present display device is the attraction of attention and excitation of wonder by the simultaneous rotation of multiple revoluble members in different divergent planes about angularly disposed axes, without visible means of motion transmission.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A vibration actuated assembly, including a branched standard, a revoluble annular member suspended thereon, a frictional bearing surface with which the annular member engages, a vertically disposed spindle projecting from said standard, a revoluble body journaled on the spindle, an interposed nap bearing surface covering between the spindle and revoluble member attached to one of said members and having its nap bearing face engaging the other member, an electro magnet common to the annular member and the said revoluble body, an armature attracted and released by said magnet in rapid succession, said armature being connected with said standard to which vibratory impulses are thereby transmitted, the construction and arrangement being such that the vibratory impulses of the common armature are transmitted through the stand simultaneously to the annular member and to the revoluble body energizing both said members for rotary motion in their respective divergent planes.

2. A vibration actuated assembly, including a support, a plurality of revoluble members mounted on said support for simultaneous rotation in divergent planes, a directional frictional bearing surface being provided between said support and said revoluble members, an electro magnet, an endless frame of magnetic material surrounding the magnet functioning as an armature and attracted and released by the magnet in rapid succession, upon which the support is mounted, a vibration absorbent base for said endless frame, and adjustable means for varying the relation of the magnet and endless frame to modify the vibratory influence upon the support of the attraction and release of the frame, the construction and arrangement being such that vibratory impulses are transmitted through the support to the revoluble members of the plurality to effect simultaneous rotation thereof in their respective divergent planes.

3. A vibration actuated assembly, including a support, a rotary member mounted thereon, a frictional surface on one of the said members and engaging the other member, the frictional surface being such as to enable free relative motion thereof in one direction and resisting relative motion of the members in reverse direction, an electro magnet, an armature therefor associated with the assembly, attracted and released by the magnet in rapid succession, the vibration impulses generated thereby being transmitted through the assembly to the support and rotary member, thereby inducing relative rotary motion thereon in one direction only.

4. A vibration actuated assembly, including a support, a rotary member mounted thereon, dual spaced bearing areas engaged by said rotary member, a frictional surface on one of said bearing areas only, an electro magnet, an armature associated with the support, and attracted and released in rapid succession, the vibratory impulses thereby induced being transmitted through the support to the rotary member thereby imparting thereto through the frictional surface bearing area a series of unidirectional motive impulses.

5. A display device, including a member revoluble in a substantially vertical plane, and a member revoluble in a substantially horizontal plane, a support therefor common to the members, a directional frictional bearing surface positioned between each of said revoluble members and said support, an electrically energized vibratory impulse generator, means for varying the intensity of the generated impulses, the generated vibratory impulses being transmitted through the common support simultaneously to the rotary members revoluble in both substantially vertical and horizontal planes to induce simultaneous rotation of the said members in both planes.

6. A display device, including a bifurcated vibratory support, a ring suspended upon the extremities of furcations of the support, a bearing body of friction material carried by one furcation and engaged by the suspended ring, a bearing of nonfriction material carried by the other furcation of the vibratory support also engaged by the suspended ring, a generator of vibratory impulses transmitting such impulses through the support to the ring to induce rotary motion thereof, the direction of rotation of the ring being reversible by transposition of the friction and non-friction bearings for the ring.

7. A vibration actuated assembly, including a spindle, a revoluble member journaled thereon, a socket in the body of said revoluble member having a closed end into which the spindle projects, an adjustable headed stud in the extremity of the spindle with which the revoluble body has axial thrust engagement, a frictional surface upon one of said members permitting free rotation of the revoluble body in one direction relative to the spindle, and resisting relative movement thereof in the opposite direction, the adjustment of the stud in the extremity of the spindle being effective to vary the degree of contact pressure of the friction surface of one member upon the other of said interpivoted members, and a vibration generator the vibratory impulses of which are transmitted to the spindle and rotary member to induce unidirectional motive influence to the rotary member.

8. A vibration actuated assembly including a support, a spindle fixed on said support, said spindle having a head member, a revoluble member having a socket adapted to receive said head member, a frictional surface upon one of said members permitting free rotation of the revoluble member in one direction relative to the spindle and resisting relative movement thereof in the opposite direction, means to vary the degree of contact pressure of the frictional surface of one member upon the other of said members, and a vibration generator the vibratory impulses of which are transmitted to the spindle and revoluble members through the frictional surface to induce uni-directional motive influence to the revoluble member, the speed of rotation of said revoluble member being influenced by the said pressure varying means.

9. A vibration transmitting unit, including an electric magnet, an armature subject to alternate attraction and release by the magnet, a mounting for the magnet upon which the magnet is capable of tilting motion toward and from the armature to vary the force of the attractive influence of the magnet, a support, a rotary member mounted thereon for relative revoluble motion to which a succession of vibratory impulses are transmitted from the armature through said support to induce revoluble motion of the rotary member, there being a directional frictional bearing surface positioned between said support and said rotary member, and means for adjusting the tilting movement of the magnet.

WALTER P. NIBLICK.

REFERENCES CITED

The following references are of record in the file of this patent:

UNITED STATES PATENTS

| Number | Name | Date |
|---|---|---|
| 1,600,088 | Burstyn | Sept. 14, 1926 |
| 1,718,147 | Hermann et al. | June 18, 1929 |
| 1,836,748 | Carley | Dec. 15, 1931 |

FOREIGN PATENTS

| Number | Country | Date |
|---|---|---|
| 197,679 | Great Britain | Nov. 10, 1924 |